No. 612,379. Patented Oct. 11, 1898.
E. CLAFFEY & O. P. KOPLIN.
WHEEL TIRE.
(Application filed Dec. 30, 1897.)

(No Model.)

WITNESSES
R. 3. Moser
H. E. Mudra

INVENTORS
Edward Claffey
Orie P. Koplin
BY
H. F. Fisher
ATTORNEY.

UNITED STATES PATENT OFFICE.

EDWARD CLAFFEY AND ORIE P. KOPLIN, OF AKRON, OHIO, ASSIGNORS OF ONE-HALF TO JACOB PFEIFFER, OF SAME PLACE.

WHEEL-TIRE.

SPECIFICATION forming part of Letters Patent No. 612,379, dated October 11, 1898.

Application filed December 30, 1897. Serial No. 664,673. (No model.)

*To all whom it may concern:*

Be it known that we, EDWARD CLAFFEY and ORIE P. KOPLIN, citizens of the United States, residing at Akron, in the county of Summit and State of Ohio, have invented certain new and useful Improvements in Wheel-Tires; and we do declare that the following is a full, clear, and exact description of the invention, which will enable others skilled in the art to which it appertains to make and use the same.

Our invention relates to wheel-tires; and the object of the invention is to provide a tire for bicycles, tricycles, and other vehicles in which a cushioned or spring tire is desirable and which will substitute the well-known pneumatic tire.

To these several ends the invention consists, first, in the method or process of making the tire; secondly, in a tire filled with sponge-rubber to give it the springy effect and which is covered by an insulating material, and, thirdly, in the tire as a whole, all substantially as shown and described, and particularly pointed out in the claims.

Figure 1:
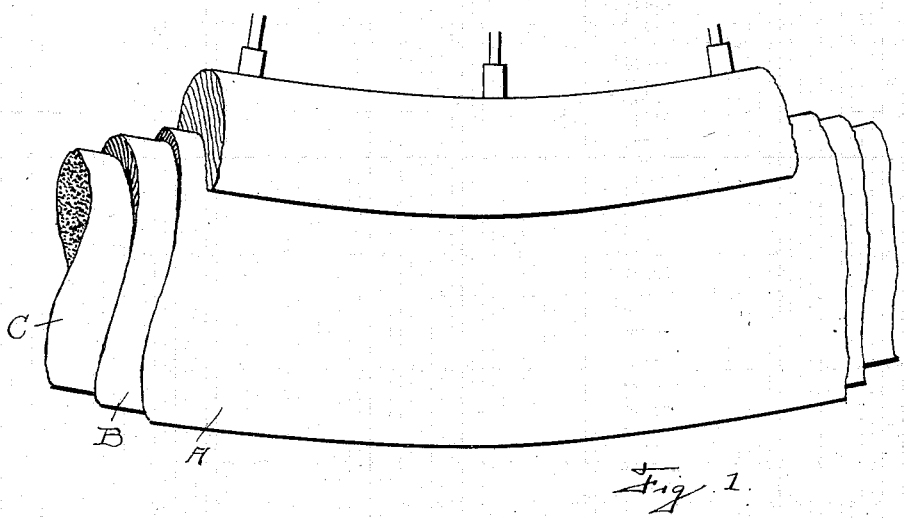
Figure 2:
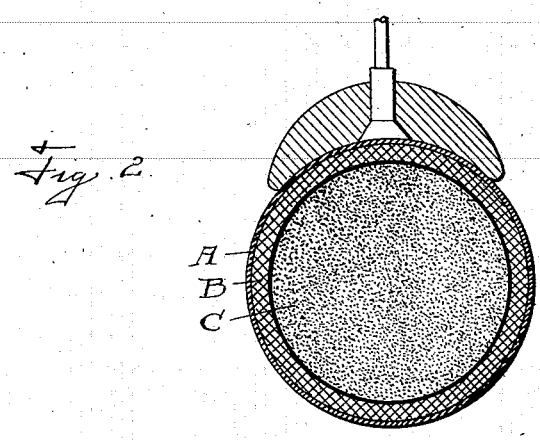

In the accompanying drawings, Figure 1 is a longitudinal sectional elevation of a section of a complete tire, and Fig. 2 is a cross-section thereof.

In the tire shown in the foregoing views three distinct and separate elements appear and are essential to the invention—viz., the outer rubber tube A, the inner tube B, of woven asbestos fabric, or of an equivalent non-conducting or insulating material next within the rubber tube and fitting closely therein, and the sponge-rubber filling C within the asbestos tube or covering constituting the core of the tire. These several elements are found both in the complete tire itself as an article of manufacture and in the process or method of manufacturing the same and are essential in both cases. Thus in the manufacture of the tire it is our practice, first, to bring the rubber tube A and the asbestos or like insulating-tube B together, as shown, and then to fill the asbestos tube with ground sponge. This latter step in the process needs to be carefully performed, so that the ground rubber shall be uniformly and evenly distributed throughout the tube, as otherwise the tire would be uneven in density and resistance or resiliency at different points, and this would render it unserviceable. Hence the utmost care must be taken to fill the tube B evenly with the ground rubber. The degree of resiliency or firmness of the tire, likewise, is determined at this time, and more or less compactness is given to the ground rubber as a more or less compact core is desired. Experience will soon tell about how solid the ground rubber needs to be made to get a given effect in the completed tire. Now, having united these several elements in the manner and form substantially as above described we proceed with the second step in the manufacture, which is the vulcanizing of the rubber outer tube A and the ground rubber C. It is at this point that the insulating and resisting element or member B of the tire first comes into service. The two rubber elements A and C perform wholly different offices, and hence must have different character and quality. Thus the tube A is essentially a containing-tube for the other elements, taking all the outside wear and tear of exposure and use, while the ground rubber forming core C is a confined element on which the tire depends for its resiliency. It follows, therefore, that different degrees of vulcanization must be had for A and C when they are brought together, as shown, and the core C must be exposed to materially less heat in vulcanizing than tube A. The asbestos or insulating-tube B, therefore, serves the purpose of protecting the ground rubber in the vulcanizing process, so that while the tube A is developed to the requisite firmness and consistency for its place and use the ground rubber is converted into a spongy mass of more or less compactness, according as the tubes were filled more or less densely with the ground material. It thus appears that the insulation B is indispensable to the manufacture of our tire, and it may have more or less thickness, according to the measure of heat desired for treating the inside rubber or core C. However, the material B does not enter alone into the manufacture of the tire, but it also forms an inner wall of such character and quality as materially stiffens and braces the outer tube A, and we can therefore lighten the outer tube in the proportion that the inner tube comes to the relief of the same, thus working economy of manufacture without taking from the efficiency of the tire. The tire as thus made and used is entirely in one piece, cut off to the required length and having only one joint where united. In appearance it need not be unlike the ordinary pneumatic tube, and it is designed to have the same resiliency and effect in use, so that a rider will experience no difference as compared with the pneumatic tube.

Lastly, it will be seen that the great objection to the pneumatic tube of its becoming worthless through puncturing is wholly avoided in this tire, and that punctures may occur without in the least injuring the tire or affecting its usefulness. There is therefore no need of being always equipped with means to mend punctures and a pump to inflate the tube, besides the many kindred annoyances of keeping a pneumatic tube in running shape, while in respect to ease and comfort in riding our tire is believed to be the equal of the best tires known. In weight it does not exceed ordinary tires, as the sponge core is exceedingly light, and altogether a tire is produced which has everything to recommend it to hard service, and especially fits it for military and like purposes.

What we claim is—

1. The method of making a yielding wheel-tire, consisting in uniting a rubber tube and a tube of non-heat-conducting non-combustible material, the rubber tube being placed outside, then filling the inner of said tubes with ground rubber, and then vulcanizing the said ground rubber and the outside rubber tube in the same heating, whereby the inside of the tire is heated through the non-heat-conducting tube and rendered spongy and springy and the rubber outside tube is made firm, substantially as described.

2. A wheel-tire consisting of a rubber tube, a core of sponge-rubber therein and an intermediate tube of non-heat-conducting non-combustible material about said core and covered by said rubber tube, said inner and outer elements being vulcanized at the same time, substantially as described.

3. As a new article of manufacture, a wheel-tire consisting of a rubber tube, a tube of woven asbestos next within said rubber tube and a core of spongy rubber within said asbestos tube vulcanized therein to a different degree of hardness from said rubber tube, substantially as described.

Witness our hands to the foregoing specification this 27th day of December, 1897.

EDWARD CLAFFEY.
ORIE P. KOPLIN.

Witnesses:
E. C. HOUSEL,
BRUCE WILSON.